(12) United States Patent
Stern

(10) Patent No.: US 7,242,389 B1
(45) Date of Patent: Jul. 10, 2007

(54) SYSTEM AND METHOD FOR A LARGE FORMAT COLLABORATIVE DISPLAY FOR SHARING INFORMATION

(75) Inventor: Peter T. Stern, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 10/680,761

(22) Filed: Oct. 7, 2003

(51) Int. Cl.
*G09G 5/08* (2006.01)
*G06F 3/00* (2006.01)

(52) U.S. Cl. ...................................... 345/158; 715/751

(58) Field of Classification Search ........ 345/173–183, 345/156, 157, 158; 434/3–5, 257, 350, 307 R, 434/327, 118, 365; 709/204; 715/751–753
See application file for complete search history.

(56) References Cited

U.S. PATENT DOCUMENTS

| | | | |
|---|---|---|---|
| 5,561,811 A * | 10/1996 | Bier ............................... | 710/5 |
| 5,600,778 A * | 2/1997 | Swanson et al. ............ | 715/762 |
| 5,818,421 A * | 10/1998 | Ogino et al. ................ | 345/157 |
| 6,072,463 A * | 6/2000 | Glaser ......................... | 715/753 |
| 6,388,654 B1 * | 5/2002 | Platzker et al. ............. | 345/156 |
| 6,595,781 B2 * | 7/2003 | Sutton ......................... | 434/276 |
| 6,823,481 B2 * | 11/2004 | Takekawa ..................... | 714/48 |

OTHER PUBLICATIONS

BlueBoards in Use: Large Public Displays for Collaboration, Seminar Details—Multi-University/Research Lab (MURL) Seminar Series online, http://murl.microsoft.com/LectureDetails.asp?983, At least as early as Sep. 28, 2001.

Mark Hachman, IBM "BlueBoards" To Monitor Mars Rover, PC Magazine The Independent Guide To Technology online, http://www.pcmag.com/article2/0,4149,5914,00.asp, Jun. 6, 2002.

Daniel M. Russell, Jay Trimble, and Roxana Wales, "Two paths from the same place: Task driven and human-centered evolation of a group information surface," Make It Easy Conference, San Jose, CA, USA, Jun. 2002.

Daniel M. Russell, Clemens Drew and Alison Sue, "Social Aspects of Using Large Public Interactive Displays for Collaboration," CSCW Workshop on Large Displays, Oct. 2002.

Daniel M. Russell, "Large interactive public displays: Use patterns, support patterns, community patterns," Nov. 2002.

BlueBoard, http://www.almaden.ibm.com/software/user/Blueboard/index.shtml, At least as early as Jul. 1, 2003.

* cited by examiner

*Primary Examiner*—Kevin M Nguyen
(74) *Attorney, Agent, or Firm*—Merchant & Gould

(57) ABSTRACT

System and method for providing an interactive collaborative display for sharing electronic data in an educational environment. The system and method include a large format collaboration display that is capable of simultaneously displaying multiple documents and simultaneously accepting multiple inputs from multiple students. The system and method support multiple user simultaneous input through stylus input devices and offers a paper-like interface for edit electronic data. The system and method also offers real-time communications and collaboration tools and is also capable of running a variety of curriculum management tools and resources.

20 Claims, 3 Drawing Sheets

SYSTEM AND METHOD FOR A LARGE FORMAT COLLABORATIVE DISPLAY FOR SHARING INFORMATION

TECHNICAL FIELD

The present invention is directed toward a large format collaborative display for sharing information, and more particularly to a large format collaborative display for use as an educational tool that allows multiple users to simultaneously input and share data.

BACKGROUND OF THE INVENTION

The blackboard has long been the collaborative tool used to convey information to students in an educational environment. For many years, the act of placing chalk on slate has been a highly effective and inexpensive method for teachers to provide daily lessons to students from kindergarten through graduate schools. However, with the rapid growth of information technology, the amount of information teachers convey to students has increased dramatically. Unfortunately, the blackboard is limited by how quickly the teacher can write the lesson on the blackboard and by how quickly the students can copy the information provided by the teacher. As the amount of information the teacher must teach increases, the faster the teacher and students must write. Unfortunately, if the students are unable to copy the material from the blackboard in a timely fashion, there is a risk of information loss.

One solution to insure that students receive all of the information taught by the teacher on a given day was the "electronic whiteboard." The electronic whiteboard provided the instructor with the option of generating a copy of everything he or she wrote on the whiteboard before it was erased. The electronic whiteboard allowed instructors to electronically scan the whiteboard and produce an exact copy of the information on the whiteboard before he or she erased the lesson from the whiteboard. At the end of class, the instructor could make photocopies of outputs from the electronic whiteboard and distribute them to the students. The electronic whiteboard made the task of taking notes easier for students, in that the printed output of the contents written on the whiteboard provided the students with a "backup" for their note taking. If any student failed to completely copy the instructor's notes from the whiteboard, the student could simply refer to the printed output to fill in any missing notes. Not only did this insure that the students had a complete copy of the instructor's class notes, but it also reduced interruptions to the lecture, because fewer students had to ask the instructor to repeat material that the students failed to note. The reduction in classroom interruption during the instructor's class lecture allowed the instructors to present more material to the students, thereby increasing their knowledge base.

The electronic whiteboard, however, has several drawbacks. First, because the electronic whiteboard provides a printed copy of the content written on the whiteboard, it is expensive. Secondly, only information physically written by the instructor on the whiteboard may be outputted in printed form. There is no way for the instructor to introduce electronic information, such as Web page content, images, or interactive material to the class through the electronic whiteboard. If an instructor wanted to take advantage of digital information on the Internet, the instructor would have to provide that information in a separate format, which increased the amount of paper that a student received and, therefore, increased the likelihood of information loss.

Another disadvantage of the electronic whiteboard is that although the electronic whiteboard supports multiple users in that multiple students may write on the board at one time, there is no way to distinguish which student wrote what notes when the copy of the whiteboard is printed out. Still another disadvantage of the electronic whiteboard is that the instructor and students cannot share digital data with one another. The electronic whiteboard cannot display or process digital information from outside sources, such as the Internet and the like. Yet another disadvantage of the electronic whiteboard is that the instructor and students have to be in the same physical location due to the fact that the information written on the electronic whiteboard cannot be shared over a distributed network.

A possible solution to the electronic whiteboard was proposed by International Business Machines, Inc., through a product called the IBM Blueboard (hereinafter IBM Blueboard), which allows multiple users at different locations to interact in a collaborative manner. The IBM Blueboard allows a small number of people to interact with the display device to retrieve information, sketch ideas, and share information. The display is covered by a resistive touch screen film, which allows users to input information by touching the display, thereby eliminating the need for a keyboard or a mouse. Users "register" themselves during a session by swiping an identification card through a card reader attached to the IBM Blueboard. The act of swiping the identification card causes the system to display a personal icon, which is representative of the user in a portion of the display. The personal icon, in addition to identifying the registered user, serves several functions. First the personal icon is a rapid access point to the user's personal content. The user sets up their personal content such as calendars, documents, and a web address for a home page. Once the user registers with the system, the home page is linked to their personal icon so that the home page is displayed by touching the user's personal icon.

Second, the personal icon is also a mechanism for registered users to share information through the IBM Blueboard. If one user is working on a document or viewing a particularly interesting Web page, the user may share the document or Web page with any other registered user by using a drag and drop operation to drag content from the document or Web page to the personal icon of the intended recipient where the content is dropped. By effectuating a drag and drop operation, a copy of the content in the document or Web page is deposited on the recipient's home page. When the user logs out of the IBM Blueboard, the copy of the content on the recipient's home page is e-mailed to the recipient.

Another feature of the IBM Blueboard is that multiple Blueboards may be linked together through a distributed network. This allows multiple users at geographically remote locations to conduct meetings and share information. However, there are several drawbacks with the IBM Blueboard. First, although the IBM Blueboard allows multiple users to input data simultaneously, the users can only operate on one document at a time. Secondly, when a registered user takes control of the IBM Blueboard by being the "active" user, only content from his or her home page may be displayed. Unfortunately, allowing only the content of the active user to be presented on the display coupled with limiting the number of documents that can be accessed at the same time does not present the necessary collaborative environment needed for educational purposes.

Thus, there is a general need in the art for a system that allows users to share information with other users in such a manner to facilitate collaborative learning. More particularly, there is a need in the art for a system and method to allow students to share digital information in a collaborative, classroom environment to enhance the classroom experience.

SUMMARY OF THE INVENTION

The present invention meets the above-described need in system for allowing collaboration among students using digital data in a classroom environment. Generally described, the present invention includes a system for providing an interactive collaborative display for sharing electronic data in an educational environment. The system includes a large format collaboration display that is capable of simultaneously displaying multiple documents and simultaneously accepting multiple inputs from multiple students. The system also supports multiple customizable cursors, to allow easy recognition of the multiple users and their interaction. The customizable cursors may be selected from a library that contains various symbols and colors. Alternatively, the customizable cursors may be created in any application that is capable of exporting graphical interchange format (GIF), joint photographic experts group (JPEG), portable network graphics (PNG), or bitmap (BMP) file formats. The customizable cursor selection occurs during the first time a new user registers with the system and becomes part of the new user's profile information. Users may then interact together simultaneously either on the same display or from one or more, remote locations. Multiple users may simultaneously collaborate on the same document or work separately on different documents and/or applications in a shared user interface working environment. In addition to the shared user interface working environment, the system also supports partitioning the workspace to enable a side by side (i.e., separate and parallel) working environment. The system is primarily optimized for stylus input but supports a variety of input devices including, but not limited to, the trackball, mouse, and keyboard. The ability to support multiple simultaneous users will enable a variety of new types of collaboration, enrich existing collaboration models, accelerate peer teaching and learning, and reduce communication issues.

The system also contains a processing unit coupled to the large format collaborative display, which is operable for processing instructions for controlling the large format collaborative display. Additionally, the system contains a data storage unit that storing electronic data processed by the large format collaborative display.

More specifically described, the present invention includes a resistive tough screen overly for the large format collaborative display, which receives input signals from a number of users. The large format collaborative display is divided into several resizable areas. First the large format collaborative display contains a display area, which is used to display and modify the electronic data. The large format collaborative display also contains a collaborative area for sharing and tracking electronic data and files. Lastly, the large format collaborative display contains a real-time communications area for viewing real-time streaming audio and video files.

The invention also contains a number of input devices, which are typically styluses. Each input device contains an identifying indicia that is associated with a user when the user logs onto the system and is used to track the user's input signals.

The invention may also contain a communications unit, which is used to transmit and receive digital data over a distributed network.

The invention may also contain a method for sharing information between several users through a large format collaborative display. The method begins when a user registers or logs onto the large format collaborative system. Next, at least one input device is associated with the registered user for tracking and storing the users subsequent input signals. Input signals are received from the registered user and an electronic document is display in the large format collaborative display in response to the input signals. Once the electronic document is displayed, input signals from input device associated with the registered user are received. The input signals are then associated with the registered user and are then stored with the electronic document. The electronic document is then shared among several registered users.

The various aspects of the present invention may be more clearly understood and appreciated from a review of the following detailed description of the invention and by reference to the appended drawings and claims.

DETAILED DESCRIPTION OF THE INVENTION

The present invention is typically embodied in a system that encourages collaboration between students of digital data in a classroom environment. The system typically uses a large format collaboration display, which is integrated with a processing unit, which may be either a client platform, such as a personal computer or workstation, or a server platform. The large format collaboration display is covered by a resistive touch screen film and supports multiple user stylus inputs simultaneously. The combination of the resistive touch screen film and the stylus input provides a paper-like feel for writing and drawing. The large format collaborative display also offers real-time communications and collaboration tools. The system connects to the global learning environment through a distributed network, such as the Internet, using XML WEB SERVICES. The system is also extensible. That is the system is capable of running a variety of curriculum management tools and resources required for the educational institutions. Although the present invention is described as being used in an education environment, those skilled in the art will appreciate that the invention may be used in other collaborative environments that encourage the creation and sharing of information between a number of users, such as conferences, seminars, and the like.

Figure 1:
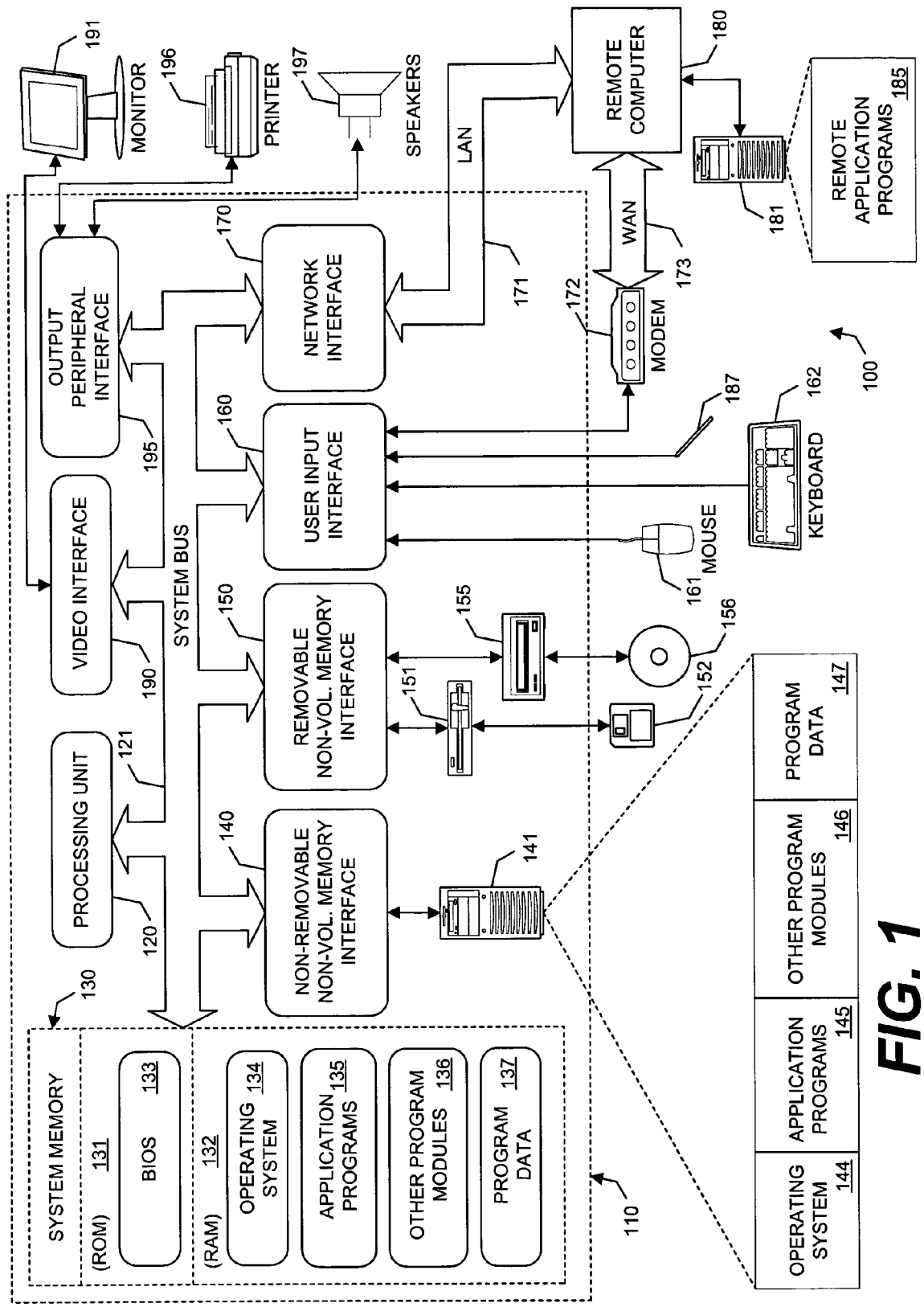
FIG. 1 is a block diagram illustrating a computing environment for implementing a large format collaborative display.

FIG. 1 illustrates an example of a suitable computing system environment 100 on which the large format collaboration display may be implemented on. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, educational application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a stylus 187. A keyboard 162 and pointing device 161, commonly referred to as a mouse, trackball or touch pad may also be used to compliment the stylus 187. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
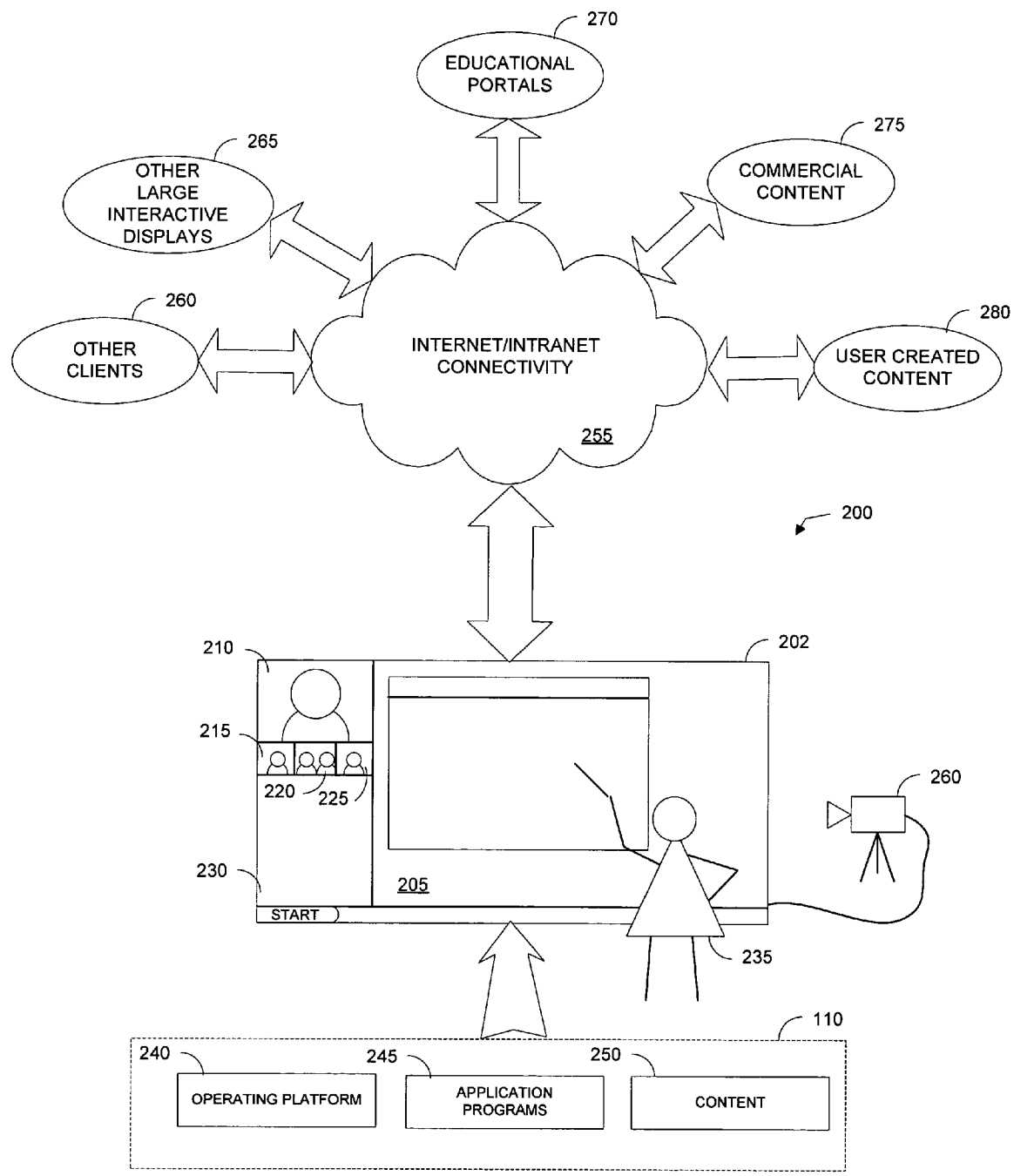
FIG. 2 is a block diagram illustrating a system for sharing digital information among several users through a large format collaborative display.

FIG. 2 is a block diagram illustrating a typical system 200 for sharing information between multiple users in a collaborative environment. The system 200 includes a large format collaboration display 202 for displaying digital information. Typically, the large format collaboration display 202 is a 1.3 meter high definition plasma display such as the PFM-32C1 PLASMAPRO, manufactured by the Sony Electronics of America Corporation of Park Ridge, N.J. Although the large format collaboration display 202 is described as a plasma display, those skilled in the art will appreciate that other types of large format collaboration displays, such as liquid crystal displays (LCDs), cathode ray tube (CRT) display, and the like may also be used without departing from the scope of the invention. The large format collaboration display 202 may be divided into several regions that are used for displaying different types of digital information. For example, the large format collaboration display 202 typically has a data display area 205, which is the main area used to display and share the documents, images, Web pages, and other digital information among users.

The large format collaborative collaboration display 202 may also have a collaboration area 230 for sharing documents and data. The collaboration area 230 may contain an icon or other identifying indicia 215, 220, and 225 that are associated with each registered user. The icon may act as a gateway to the registered user's personal account.

The large format collaboration display 202 may also have a number of input devices for receiving inputs from the teacher and students. Typically, the large format collaboration display 202 will have a resistive touch screen overlay, such as SMART Board for Plasma Displays touch screen overlay manufactured by SMART Technologies, Inc. of Calgary, Alberta, Canada. The resistive touch screen overlay allows teachers and students to control the operation of the system by directly touching the screen and using drag-and-drop technology. In addition to the resistive overlay, the large format collaboration display 102 may use ActivePen and Digital Ink technology that allows users to write in "digital ink." The combination of the resistive touch screen overlay and ActivePen and Digital Ink technology provides teachers and students with a blackboard-like interface for accessing documents, taking notes, and annotating document display in the data display area. Furthermore, in addition to the stylus input device, the large format collaborative display 202 may also have more conventional input devices, such as a keyboard, mouse, and the like.

The large format collaborative display 202 is connected to a computer 110, which is described above in FIG. 1. The computer 110 contains an operating platform 240, such as the WINDOWS® Client or the "WINDOWS® server platform of operating systems, manufactured by the Microsoft Corporation of Redmond, Wash. In addition the computer 110 may be running education application programs 245, such as MICROSOFT® ENCARTA™, reference application programs, MICROSOFT® OFFICE, and curriculum tools, such as the K-12 Extended Markup Language (XML) schema and Instructional Management Systems (IMS) content standards toolkit. Additionally, the computer may also support educational content 250, such as mapping application programs and reference application programs, such as dictionary application programs, thesaurus application programs, and almanac application programs. The computer 110 may also be connected to a distributed network 155, such as the Internet, a local area network (LAN), a wide area network, (WAN), and the like to provide Internet and/or Intranet connectivity, such as through Extensible Markup Language (XML) Web Services, manufactured by Microsoft Corporation of Redmond, Wash. Through the XML Web Services and appropriate networking hardware, the processing unit 104 is capable of sharing information with other client platforms 260, other large format collaboration displays 265, educational portals 270, commercial content 275, such as external Web pages, and user created content 280. A unique function of the large format collaborative display 202 is that by connecting to a distributed network 255, the information displayed on the large format collaboration display 202 may also be displayed in real-time on other large format collaboration displays 265 or other client platforms 260 located at remote locations. For example, many universities have numerous satellite campuses, in addition to the main campus, to appeal to a wider student base. A professor could teach a using the large format collaboration display 202 to present the material in a classroom on the main campus while the lesson is simultaneously displayed on similar large format collaboration display units 265 located at the satellite locations.

The large format collaboration display 202 may also contain a digital video camera 260. The digital video camera 260 is used to provide digital video of teachers and students located at each remote site. The digital video is displayed in a real-time communication area 210 located in the large format collaboration display 202. Typically, the user who has control of the large format collaboration display 202 is displayed through video data in the real-time communications area 210. Typically, the active user is the user who currently is in control of the documents displayed in the display area 205.

Figure 3:
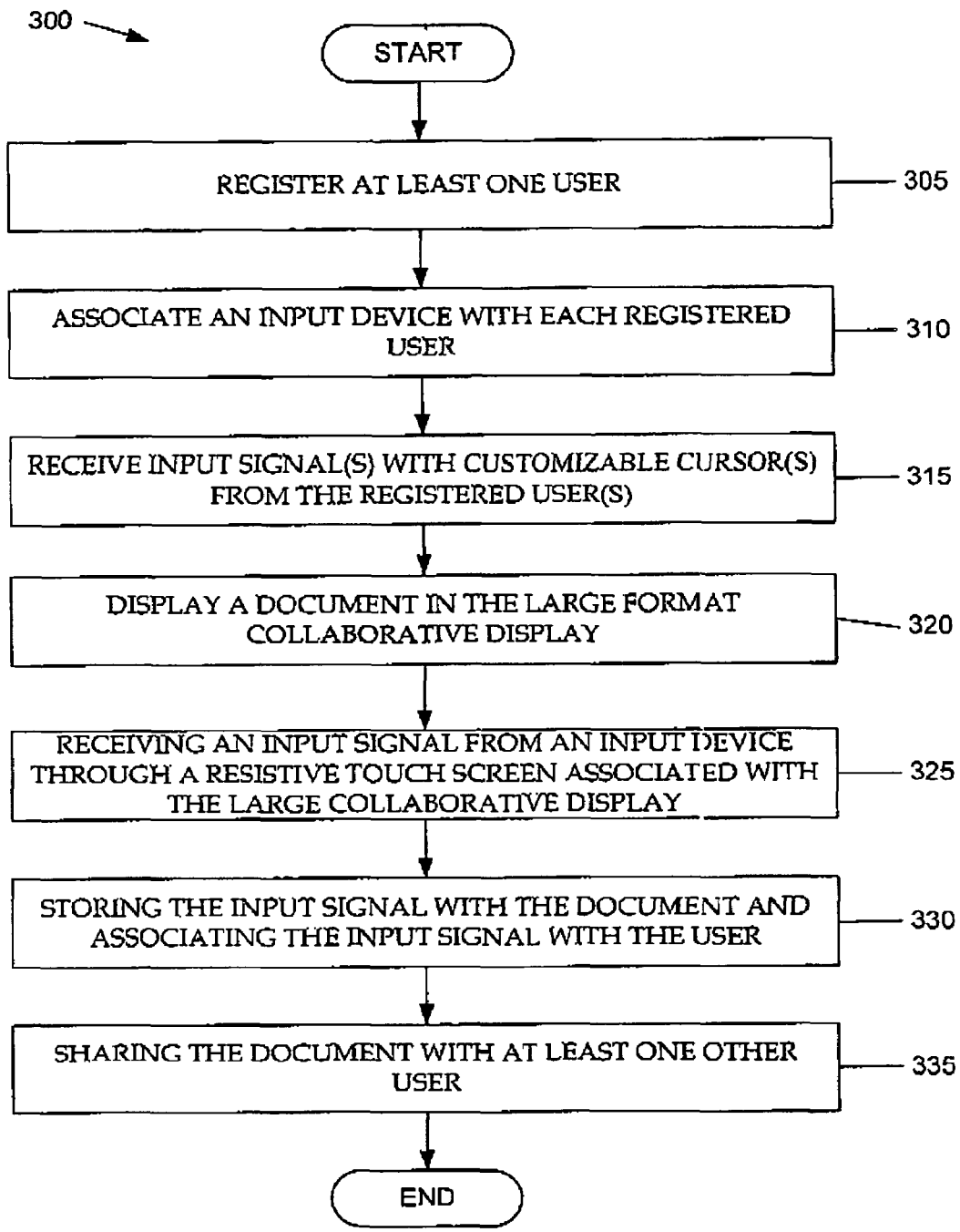
FIG. 3 is a logic flow diagram illustrating a routine for sharing documents among several users using a large format collaborative display.

FIG. 3 is a logic flow diagram illustrating a routine 300 for sharing documents among users using a large format collaborative display 202. Routine 300 begins at 305, in which at least one user 235 logs in to or registers with the large format collaborative display's 202 operating system. Typically, users will have to be registered in order to be able to operate the input devices and gain access to documents and the like. The registration of a user is well-known in the art and is outside the scope of this invention.

Upon registration, an icon or other identifying indicia, which is associated with the registered user 235, appears in the collaborative area 230 of the large format collaborative display system 200. The icon provides an entry point to the registered user's account. For example, when the registered user 235 selects the icon, a window containing the registered users' account would be displayed. The registered user 235 could then access his or her documents, email, calendar, personal web browser, or the like.

At 310, an input device, typically a stylus 187 is associated with each of the registered users. The stylus has an associated identifying indicia, such as a serial number, or an identification number, or the like. The identifying indicia associated with the stylus is associated with the registered user so that the large format collaborative display system 202 can monitor and track the inputs for the registered user. This provides an advantage over the previous systems, because it is through the monitoring and tracking of the registered users' input commands that allow multiple registered users to simultaneously input command signals to the large format collaborative display system 202. The register user may associate the input device to his or her account by clicking on a portion of their personal icon at the beginning of the session. The identifying indicia associated with the input device is transmitted to the processing unit 120 through the resistive touch screen film overlaying the large format collaborative display 202. Additionally, the large format collaborative display system 200 supports multiple customizable cursors, to allow easy visual recognition of individual users and their interaction. Upon registration, individual users select at least one customizable cursor from a library, which includes cursors of different symbols and colors. Alternatively, the customizable cursors may be created in any application that is capable of exporting graphical interchange format (GIF), joint photographic experts group (JPEG), portable network graphics (PNG), or bitmap (BMP) file formats. The initial selection of a customizable cursor selection occurs during the initial registration process for a new user and becomes part of the user's profile information. The user may alter the appearance of the customizable cursor during subsequent registration processes.

The use of customizable cursors allows multiple users to interact together in a true collaborative manner either on the same display, or from one, or many, remote locations. Thus, a user does not have to gain control over the application and/or document to provide input. Users may collaborate simultaneously on the same document or work separately on different documents and/or applications within the display area 205 of the large format collaborative display 202, thereby creating a shared interface working environment. In addition to the shared user interface working environment, it is also possible to partition the display area 205 of the large format collaborative display 202 to enable a side-by-side (i.e., separate and parallel) working environment. The ability of the large format collaborative display system 200 to simultaneously support multiple users provides advantages over existing systems, such as enabling a variety of new types of collaboration, enriching existing collaboration models, accelerate peer teaching and learning processes, and reducing communication issues, such as time delay associated with users acquiring control of the large format collaborative display system 200.

At 315, the large format collaborative display system 200 receives at least one input signal from at least one registered user 235 through the resistive touch pad film. At 320, in response to the input signal, at least one file will be displayed in at least a portion of the display area 205 of the large format collaborative display 202. To adequately display the document, the computer 110 will open a separate window and launch the appropriate application program associated with the document. For example, if the document is a spreadsheet, the computer would open a new window and launch a spreadsheet application program, such as MICROSOFT® EXCEL™, which is manufactured by Microsoft Corporation of Redmond, Wash. Similarly, if the document is a word processing document, then the computer 110 would launch a word processing application program, such as MICROSOFT® WORD™, which is manufactured by Microsoft Corporation of Redmond, Wash., in a separate window 207. Each window may be moved or resized by the registered user by using standard commands that are well-known in the art.

At 325 the registered user may provide additional input through the input device to edit or make additions to the document. The inputs are received through the resistive touch screen film. Because the input device is associated with the registered user 235, each input can be recorded and associated with the registered user 235. At 330, each input associated with the registered user is stored with the document. Accordingly, when the document is reopened, the document will contain a consolidated view of any alteration or additions that were made and which registered user made them.

Once the inputs are stored with the document, the registered user may share the document with other registered users or any non-registered users. To share the document with registered users, the registered user 235 may use a drag-and-drop technique to drag the document from the display area 205 and drop it on the icon of the intended recipient in the collaboration region 230. When there are a large number of registered users that the registered user 235 wants to share his or her document with, as in the case of an instructor wanting to share the document with all of the students in his or her class, a single group icon may be created, in which each of the members of the group are the individual students in the class. To share documents with unregistered users, such as users located at client sites over the Internet, the registered user would have to manually email the document.

When the registered user drags-and-drops the document on the recipients icon, the document may be placed in a buffer. The document will remain in the buffer until the registered user actively forwards the document to the recipient. If the register user does not immediately forward the document, the document will remain in the buffer until the registered user logs off of the system, at which time the registered user may be prompted to send the document. At this point, the registered user may either send the document to the intended recipient or cancel the operation. If the registered user 235 sends the document, the document may be sent to each recipient via an electronic mail (email) message. Alternatively, the document may be forwarded directly to the recipient by the placing the document directly into a special folder within the recipients' account, such as a download folder, or some similar folder. At this point, the document is shared with the recipient, who may open it and view it at their leisure.

Other alternative embodiments will become apparent to those skilled in the art to which an exemplary embodiment pertains without departing from its spirit and scope. Accordingly, the scope of the present invention is defined by the appended claims rather than the foregoing description.

I claim:

1. A system for providing an interactive collaborative display in an educational environment, the system comprising:
    a processing unit;
    a data storage unit, operable for storing a plurality of instructions for the processing unit; and
    a large format collaboration display, wherein the large format collaboration display:
        simultaneously displays a plurality of different documents to a plurality of users;
        accepts simultaneous inputs from the plurality of users at least two of the simultaneous inputs from the plurality of users being in different documents of the plurality of different documents; and
        supports multiple customizable cursors representing interaction of the plurality of users each of the plurality of users having each of the multiple customizable cursors;
        wherein the plurality of users provide the simultaneous inputs without gaining control over the plurality of different documents.

2. The system of claim 1, wherein the large format collaborative display comprises a resistive touch screen overlay for receiving input signals from the plurality of users.

3. The system of claim 1, wherein the large format collaboration display is a high definition plasma display.

4. The system of claim 3, wherein the large format collaboration display comprises:
    a resizable display area;
    a resizable real-time communications area for monitoring communications with other students at remote locations;
    a resizable collaboration area for sharing documents with other users.

5. The system of claim 3, further comprising a plurality of input devices for simultaneous inputting signals from a plurality of users, wherein each input device comprises an identifying indicia for identifying the user associated with the particular input device.

6. The system of claim 1, wherein the large formal collaboration display is selected from a list consisting essentially of a liquid crystal display (LCD) and a cathode ray tube (CRT) display.

7. The system of claim 1, further comprising a communications unit, operable for transmitting and receiving content over a distributed network.

8. The system of claim 1, further comprising a plurality of educational application programs supporting educational standards selected from the list consisting essentially of K-12 Extensible Markup Language (XML) schema and the Instructional Management Systems (IMS) schema.

9. The system of claim 1, wherein the multiple customizable cursors comprise cursors selected from a library.

10. The system of claim 9, wherein the cursors selected from a library comprise cursors of various Colors.

11. The system of claim 9, wherein the cursors selected from a library comprise various symbols.

12. The system of claim 1, wherein the multiple customizable cursors are created in any application that is capable of exporting at least one of the following image formats:
    graphical interchange format (GIF);
    joint photographic experts group (JPEG);
    portable network graphics (PNG), and bitmap (BMP) file formats.

13. The system of claim 1, the selection of the multiple customizable cursor occurs during a first time a user registers with the system and becomes part of the user's profile information.

14. A method for sharing information between a plurality of users through a collaborative display, the method comprising:
    registering the plurality of users;
    receiving input signals from the plurality of registered users, wherein the input signals comprise customizable cursors representing each of the plurality of users;
    displaying simultaneously to the plurality of users a plurality of different documents in the collaborative display in response to the input signals from the registered users;
    associating at least one input device with each registered user;
    receiving the input signals through input devices in contact with a resistive touch screen overlay placed on the collaborative display;
    storing the input signals in the documents and associating the stored input signals with the registered users; and
    sharing the documents with at least one other user;
    wherein the plurality of users provide the input signals without gaining control over the plurality of different documents.

15. The method of claim 14, further comprising:
    displaying a video image of at least one of the users in at least a portion of the large collaborative display.

16. The method of claim 15, further comprising displaying the video image of the registered user in at least a portion of the collaborative displays located at the remote sites in real-time.

17. The method of claim 14, further comprising displaying the documents in real time at another collaborative display at a remote location over a distributed network.

18. The method of claim 14, wherein the collaboration display comprises:
    a resizable display area;
    a resizable real-time communications area for monitoring communications with other students at remote locations;
    a resizable collaboration area for sharing documents with other users.

19. The method of claim 14, wherein the collaborative display is a high definition plasma display.

20. The method of claim 14, wherein the collaborative display is selected from a list consisting essentially of a liquid crystal display (LCD) and a cathode ray tube (CRT) display.

* * * * *